United States Patent Office 3,303,339
Patented Feb. 7, 1967

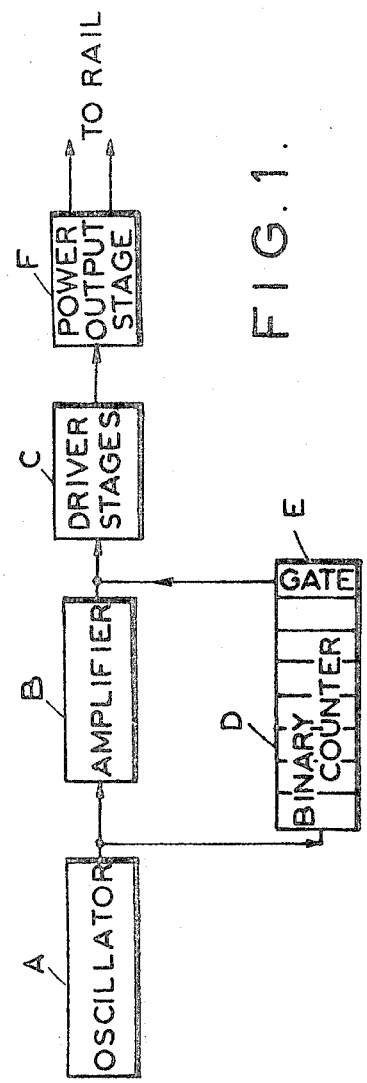

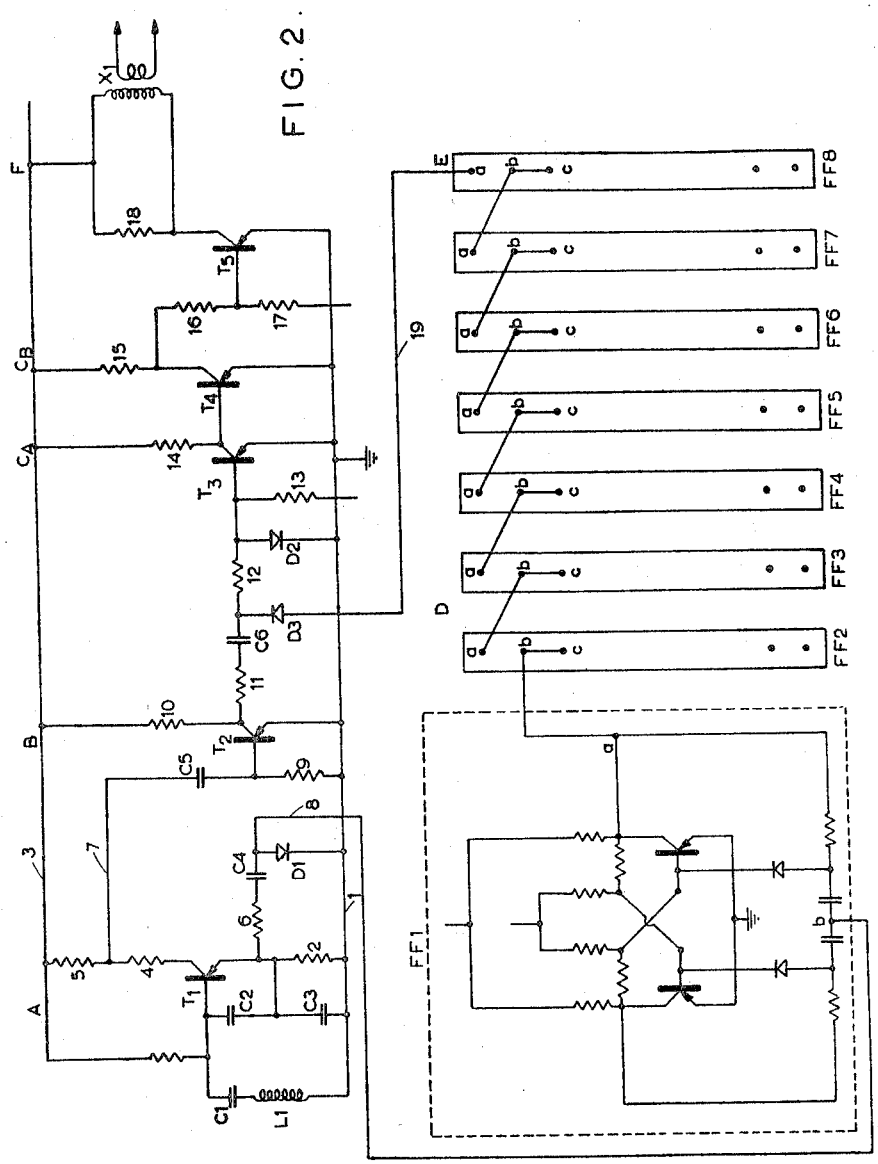

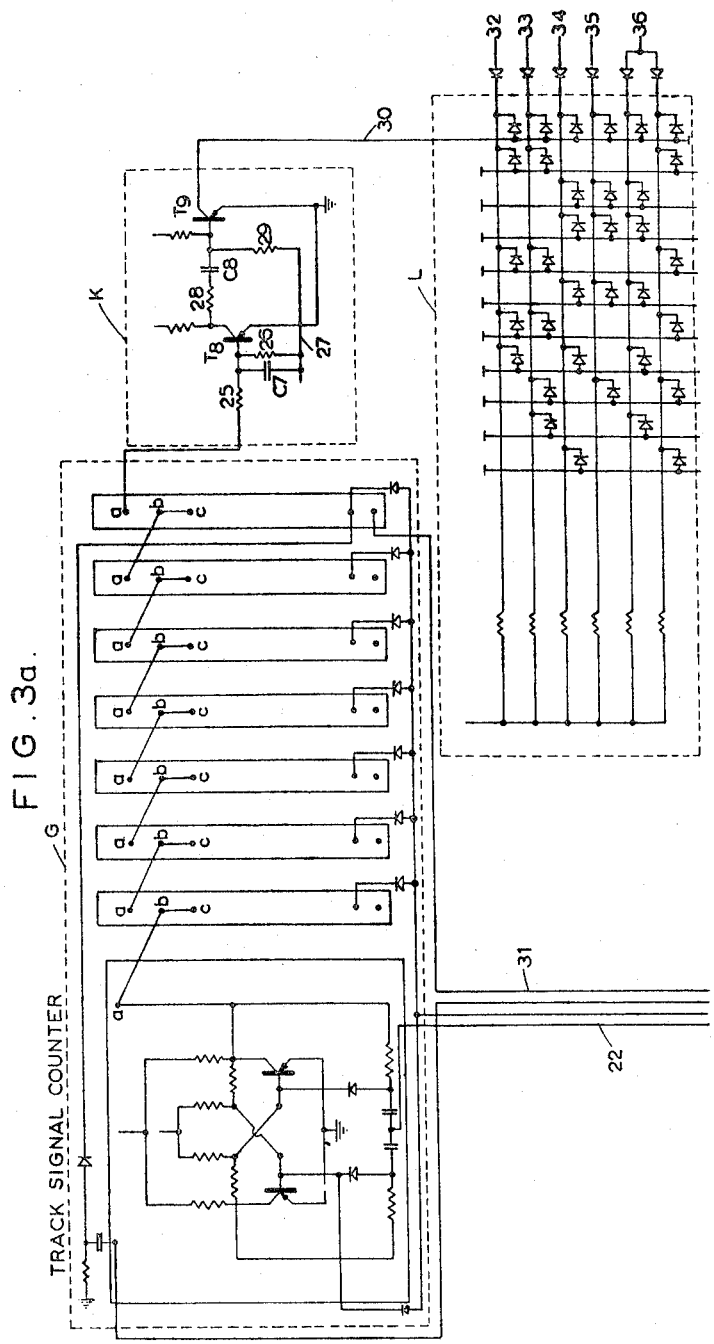

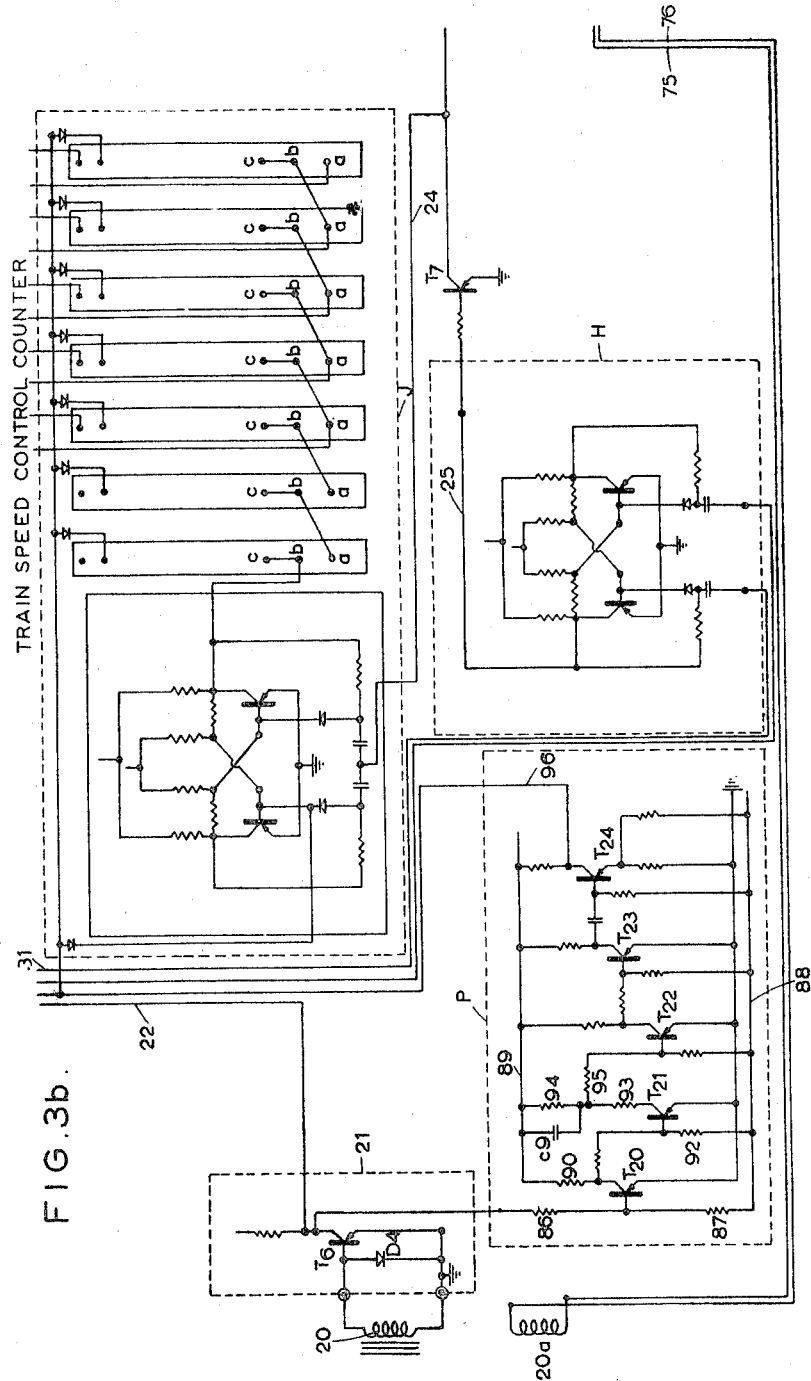

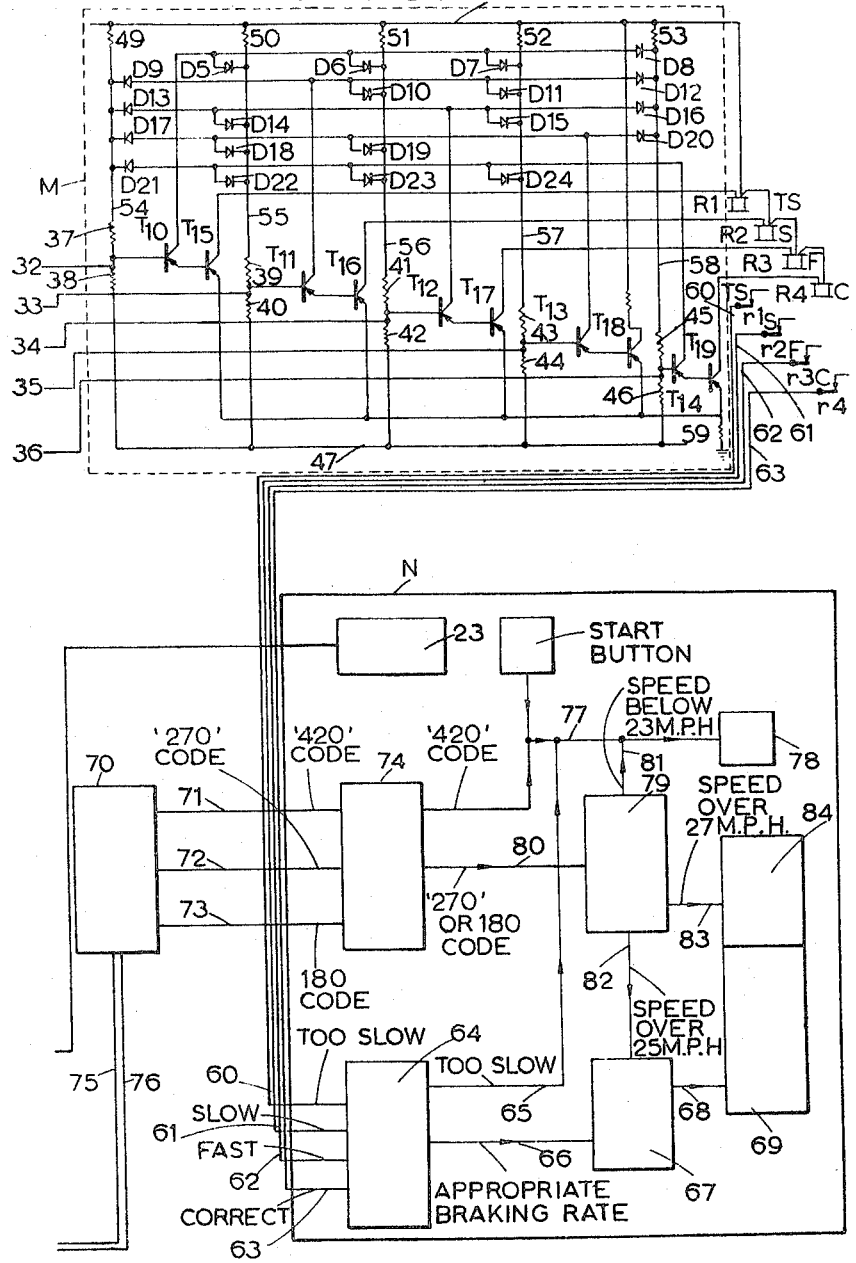

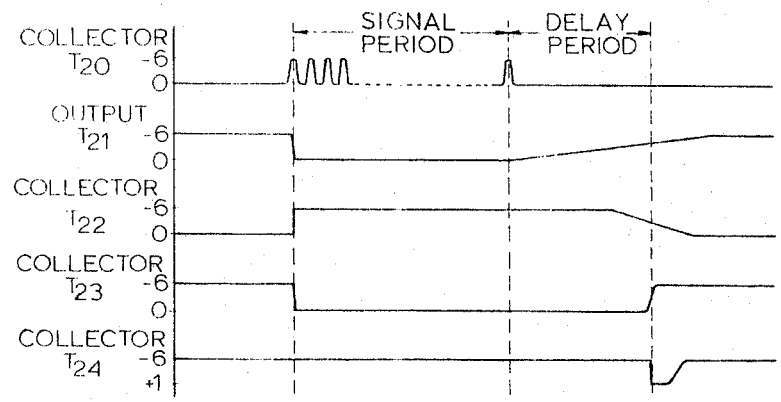
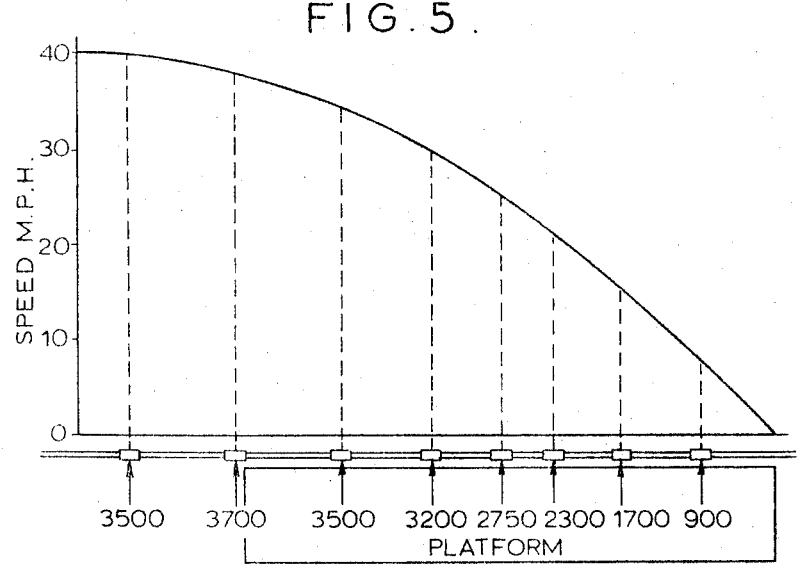

3,303,339
AUTOMATIC ELECTRIC TRAIN CONTROL
SYSTEM AND APPARATUS
Robert Dell, Sudbury, England, assignor to Westinghouse Brake and Signal Company Limited, London, England
Filed Apr. 17, 1964, Ser. No. 360,726
15 Claims. (Cl. 246—63)

This invention relates to an automatic electric train operation system and apparatus therefor by means of which the factors governing the performance of an electric train such as the speed, braking, starting, stopping, etc. thereof can be controlled wholly automatically.

It is intended in the system according to the present invention, that under normal operating conditions, each train shall be driverless, but under the control of a single operator such as a guard, who is capable of acting and competent to act, as a driver where necessary in an emergency.

It has been known heretofore to provide an automatic electric train control system wherein the automatic control of the train has been effected by a continuous coded signalling system employing coded currents applied to the track different frequencies being used for the coded currents to control different functions such as speed control, braking, etc. In such a system, coded currents are continuously applied to a section of track, passing from one terminal of a current source via a capacitor to one rail of the section in one direction and returning in the other direction to the other terminal of the source via the other rail of the section. Such a continuous coded current system will hereinafter be referred to as of the kind described.

It is an object of the present invention to provide an automatic electric train operation system which, in addition to the known continuous coded current signalling system heretofore used, employs a command current system superimposed on the heretofore known signalling system for controlling the normal running and braking of the train, and anticipating the requirements of the known signalling system which is only required to effect an emergency braking operation in the event of abnormal conditions occurring in the overall system such as a failure of the superimposed command current system.

Thus, according to the present invention there is provided an automatic electric train operation system comprising a coded current signal system known per se in which coded currents of a plurality of different frequencies are applied to sections of the track, the frequency of the current in any section being determined by the traffic conditions currently prevailing ahead of a train, a command current system in which currents of a plurality of frequencies different from those of the signal system, are superimposed thereon at predetermined points along the track, equipment carried by the train being responsive to command signals picked up from the track such that under normal running conditions, the running and braking of the train are under the control of the command system, operating independently of, and such as to anticipate the requirements of the signal system which provides background safety facilities utilisable to effect braking of a train under the control of the signal system, only in the event of any failure of the command system.

Preferably, the coded currents are produced non-mechanically by electrical means without moving parts.

In operating the system, the coded currents utilised in the signal system includes frequencies within a lower range than the range of frequencies used in the superimposed command system. The coded currents utilised in the signal system are continuously applied to the track and are picked up by pick up means carried by the train, the picked up coded current being passed to a device or devices on the train operatively sensitive to that particular coded current. The signal system controls the running of the train when any departure from the normal conditions occurs resulting in a change in the operation of the signal system to apply control to the train dependent upon the change in the normal conditions. For example the speed of the train can be reduced or in the event of an emergency a full brake application can be made. The signals of the superimposed command system, which are of a higher range of frequencies than those of the coded current signal system are applied at predetermined points on the track and utilised to effect predetermined train control functions such as braking at stations, the train having devices operatively sensitive to the command currents of the superimposed system.

In the following description of the invention the continuous coded current signal system, the superimposed command system and the apparatus associated with each of such systems are described under appropriate headings. As the greater proportion of the equipment required to carry out the invention is electrical equipment now available it is not considered necessary to give detailed descriptions of the same and accordingly where possible such equipment is referred to in general terms.

The apparatus for use in the system of the invention is adapted to meet the following requirements:

(a) Cut-off of motive power at coasting point in preparation for braking at stations.
(b) Braking to stop at stations, the stop position to be at the same point whatever the approach speed.
(c) Signal control to stop a train clear of a train ahead or in any emergency and also to stop a train at junctions or other predetermined train control positions along the track as required.
(d) Automatic restart of train when signal clears.
(e) Observation of speed restrictions.

CONTINUOUS CODED CURRENT SIGNAL SYSTEM

As previously indicated the signal system used in the present invention is of a type known per se, and in the present invention four different conditions are provided for by the provision of four different frequencies as follows:

Code 1 (hereinafter referred to as "420 code") 420 impulses /min.=full speed.
Code 2 (hereinafter referred to as "270 code") 270 impulses/min.=22 miles per hour with motoring if necessary.
Code 3 (hereinafter referred to as "180 code") 180 impulses/min.=22 miles per hour.
Code 4 (hereinafter referred to as "120 code") 120 impulses/min.=emergency stop.
Code 5—no code=emergency stop.

The "120 code" is the equivalent of "no code" since both these codes effect an emergency stop.

Along the track a limited number of fixed signals are provided. For example, one home signal per station, starting signal per station and signals at junctions. These signals would not normally perform any function, but would be available for emergency working in the event of a breakdown of equipment. They would also act as a guide to the guard of the train that conditions were normal, and also, the starting signal would act as a guide to station staff, if any, in dealing with the passengers.

The coded currents applied to the track circuits are picked up by coils on the front of a passing train, a centrifugal governor driven from the axle of the train being associated with the braking mechanism such as to effect operation of the braking mechanism in accordance with the particular safety code received and to effect an emergency braking operation if the speed of the train is inappropriate to the safety code being received.

As previously described, in the known continuous coded current signal system, the coded currents in the track circuits are applied to both rails, one continuous rail and one section rail, and as with normal track signalling systems, the track is divided into sections to give the appropriate control.

The codes are for preference arranged to be different from the usual mains frequency.

The devices on the train operable by the coded currents of the signal system perform the following operations:

"*420 code*".—This permits the train to proceed at any speed that it could attain.

"*270 code*".—This permits the train to proceed at 22 m.p.h., with motoring if necessary and can also be used to cause power to be applied to the traction apparatus to get a train moving when stopped.

"*180 code*".—This causes a brake application if the speed of the train as ascertained by the centrifugal governor, is higher than 22 m.p.h.

"*120 code*" or "*no code*".—This condition is arranged to produce an emergency brake application, and the equipment would either require re-setting by operation of a push-button or other manual control before the brakes could be released. A counter is for preference incorporated, to record the number of times the emergency brake has been applied.

SUPERIMPOSED COMMAND CURRENT SYSTEM

The feature of the present invention resides in the use of the superimposed command system in conjunction with the known continuous coded current signal system heretofore briefly described. The superimposed command system utilises track equipment and train equipment and includes apparatus for comparing signals fed to the track with signals generated by the train equipment indicative of the speed of the train whereby control of the operation of the train may be effected.

The superimposed command control equipment provides for command signals additional to the coded currents of the signal system, to be applied to the track and conveyed to the train for the control of the automatic driver, and arranged to control the train in a manner equivalent to a train driver observing signals, so that for normal running, the traction and braking of the train is under the control of the superimposed command system only and an emergency brake application made only in the event of failure of the control equipment of the superimposed command system.

A preferred embodiment of the invention will now be described by way of example only with particular reference to the accompanying drawings wherein:

FIGURE 1 is a block diagram illustrating a current generating unit of the superimposed command current track equipment;

FIGURE 2 is a circuit diagram showing details of the generating unit illustrated in block form in FIGURE 1;

FIGURES 3a, 3b and 3c are a composite circuit diagram showing details of the train equipment of the superimposed command current system;

FIGURE 4 is a timing diagram illustrating the condition of the various stages of the "no signal" detector shown in FIGURE 3; and FIGURE 5 is a braking curve devised to define the check points along the track for applying currents thereto to brake a train to a stop at a station.

The various components of the superimposed command current system will now be described with reference to the drawings under the appropriate headings.

(*a*) *Track equipment of the superimposed command current system*

For the superimposed command signals to be conveyed to a train, currents of high frequency are applied to one running rail at predetermined spaced intervals along the line. Command currents of different frequencies are allotted for various purposes. A group of frequencies are reserved for braking at a station, to give control of the braking of the train right down to stop, and a frequency spot, i.e. a signal of a selected frequency, e.g. 15 kc./s. for cutting-off the motor current at a coasting point. A 20 kc./s. frequency spot is used to effect a full service brake application at, for example, a signal position and the approach to stations.

The superimposed command current track equipment comprises a plurality of current generating units each producing superimposed command currents of high frequency. Each unit includes a transistor sine wave oscillator A (FIG. 1) tuned to a selected frequency between 500 cycles and 20,000 cycles per second. The output from oscillator A is supplied via amplifier stage B to the input of driver stages C, and also to the input of an 8-stage binary counter D. The last stage E of counter D has the output thereof connected to the input of driver stages C for a purpose hereinafter described. The command current impulses are supplied to the selected length of rail via power output stage F, the duration of each pulse being independent of the frequency of oscillator A.

Each stage of binary counter D is a bistable flip flop device and the last stage thereof is triggered each time the counter has received 128 impulses. The last stage E is thus used as a control gate to control the passage of signals from the output of amplifier stage B to the driver stages C. The arrangement of binary counter D and control gate E provides for a continuous on-off cycling of the track equipment, i.e., each operating cycle consisting of 128 cycles on during which the control gate E is in the "OFF" state and impulses from the oscillator pass to the rail, and 128 cycles off, during which the control gate E is in the "ON" state and inhibits the passage of impulses from the oscillator A to the rail. The 128 cycle count is chosen to give an accuracy of better than 1% and the 128 count enables the system to reject any signal not having a 128 cycle frequency burst and thus protects the system from the influence of spurious signals. The counter is fed in antiphase with the output circuit such that gating occurs between pulses.

The detailed operation and circuitry of one such current generating unit for the superimposed command current track equipment, will now be described with reference to FIGURE 2 of the drawings.

The oscillator A is tuned to a selected frequency and in FIGURE 2, the oscillator is tuned to a frequency of 5000 cycles per second and comprises a p-n-p junction transistor $T_1$ having the emitter thereof connected to earthed conductor 1 via a resistor 2 preferably of 1 kilohm, and the collector thereof connected to −12 v. conductor 3 via series connected resistors 4 and 5 preferably of 3.3 kilohms and 470 ohms respectively. The base of transistor $T_1$ is connected via capacitor $C_1$ and coil $L_1$ connected in series therewith, to earthed conductor 1, and also via series connected capacitors $C_2$, $C_3$ to line 1. A unidirectional current conducting device such as diode $D_1$ is connected in series with capacitor $C_4$ of 0.02 µf. and resistor 6 of 33 kilohms, between the emitter of transistor $T_1$ and earthed line 1. The output from oscillator A is applied via conductor 7 from the collector circuit of transistor $T_1$ to the base of transistor $T_2$ of amplifier B via coupling capacitor $C_5$ of 32 µf., and the output from oscillator A is also applied via conductor 8 from the emitter circuit of transistor $T_1$ to the first stage of the 8-stage binary counter D.

The base of amplifier transistor $T_2$ is connected to earthed conductor 1 via resistor 9 of 56 kilohms and the collector thereof is connected to −12 v. conductor 3 via resistor 10 of 10 kilohms. The emitter of transistor $T_2$ is grounded and the output taken from the collector which is connected to the base of transistor $T_3$ of driver circuit $C_A$ via a series connection of resistor 11 (10 kilohms), capacitor $C_6$ (1000 μf.) and resistor 12 (2.2 kilohms). The base of transistor $T_3$ is connected to ground via diode $D_2$ and also to a +6 v. source via resistor 13 of 56 kilohms. The emitter of transistor $T_3$ is grounded and the collector connected to −12 v. conductor 3 via resistor 14 of 3.9 kilohms, and to the base of transistor $T_4$ of driver circuit $C_B$, the emitter of which is grounded and the collector of which is connected to −12 v. conductor 3 via resistor 15 of 100 ohms.

A voltage divider circuit comprising series connected resistors 16, 17 of 10 ohms and 560 ohms respectively is connected between the collector of transistor $T_4$ and the +6 v. source, and a point intermediate resistors 16, 17 is connected to the base of transistor $T_5$ of the power output circuit F. The emitter of transistor $T_5$ is grounded and the collector of transistor $T_5$ connected to one terminal of the primary winding of transformer $X_1$, the other terminal thereof being connected to −12 v. line 3 and resistor 18 of 18 ohms being connected in parallel with the primary winding of transformer $X_1$ between the collector of transistor $T_5$ and −12 v. line 3. The secondary winding of transformer $X_1$ is connected to the rail such that the superimposed coded current produced by the generator unit is applied to the selected length of rail.

Thus, with the arrangement shown it will be seen that the output signals produced at the collector of transistor $T_1$ are applied to the base of transistor $T_2$ to render transistor $T_2$ conducting and the amplified signals are applied to the base of transistor $T_3$, $T_4$ and $T_5$ in turn to render such transistor conducting and supply the output signals to the rail via transformer $X_1$.

The purpose of the 8-stage counter D and gate E is to allow such output signals from the oscillator to pass to the rail for a predetermined period, i.e., 128 cycles, and to inhibit the passage of such impulses for a similar predetermined period thus producing a continuous on-off cycling operation of the generator unit.

To this end, the output signals from the oscillator A are applied to the input of the first stage of binary counter D. Each stage of counter D comprises a bi-stable flip-flop device of conventional design and will not be described in detail. The flip-flops of the counter are series connected to allow the count to proceed through the various stages thereof. It will be appreciated that the last stage E of counter D will only be triggered from the "OFF" to the "ON" state, when a count of 128 is present in the counter. It will be seen from FIGURE 2, that the last stage E of counter D is connected to a point intermediate the amplifier B and driver stage $C_A$, via diode $D_3$. The arrangement is such that each time flip flop FF8 is triggered to the "ON" state, the potential on line 19 is such as to inhibit the passage of impulses from the collector of transistor $T_2$ to the base of transistor driver $T_3$, and to allow the passage of such impulses when the flip flop FF8 is triggered to the "OFF" state.

The superimposed command currents of high frequency are applied to one running rail only, each over a distance of approximately ten feet.

The signals produced by the superimposed command currents are picked up by induction from the running rail by a coil mounted below the train.

No block joints are necessary for the application of the superimposed command currents to the running rail, which are simply passed through a section of the rail and out again by means of fixed connections to the rail.

The frequency/speed ratio proposed for signalling speed control to the train can be 100 cycles per second=1 mile per hour, and thus, the range of frequency from 500 to 5000 cycles per second covers the speed range of 5 to 50 miles per hour. This frequency/speed ratio is applicable only up to a predetermined frequency and the frequency spots of e.g. 15 kc./s. and 20 kc./s. previously referred to have no such relationship with speed.

(b) *Train equipment of the superimposed command system*

To enable brake applications to be made correctly on the train, it is necessary to provide a means of generating signals having a frequency which is proportional to the speed of the train. This frequency must be arranged so that the frequency generated is between the values of 0 and 5000 cycles per second, covering the speeds 0 to 50 miles per hour. These train signals can then be compared with the superimposed command signals picked up from the track.

Accordingly a frequency generator is provided which comprises a number of magnetic rings, each with its own pick-up coil, each such magnetic ring corresponding to a particular wheel diameter. Only one magnetic ring is used at a time, but several are provided so that the correct ring can be selected to suit the wheel diameter.

This frequency generator can be combined with a centrifugal governor used for the signalling system, making a combined unit for attachment to the end of one of the axles, or driven separately from an axle of the train.

Each magnet ring is magnetised with a series of poles giving the correct frequency to relate to the speed for a given wheel diameter. Each of the magnetic rings is therefore slightly different, and the change from one ring to another can be effected by operation of a selector switch which could be moved and sealed when the wheel diameters are checked. The current generated from the speed frequency generator is amplified by a transistor amplifier to give the power necessary for use in the subsequent circuits. The train signals are fed to an 8 stage binary counter of the same type used in the superimposed command current track equipment, giving a count of 128 cycles; such counter being hereinafter termed a train speed control counter.

(c) *Speed control*

The apparatus for speed control on the train includes two such binary counters, one of 7 elements, giving a binary count of 128 and one of 8 elements. The count in both counters is initiated in response to receipt of a superimposed command signal from the track. The 7-element binary counter, termed a track signal counter, counts the signals received from the track, and the train speed control counter, comprising 8 elements, counts the signals received from the frequency generator on the train.

When the track signal counter has reached a count of 128 both counters stop and brake control circuits are energised as follows:

(a) If the count of the train speed control counter is greater than that of the track signal counter i.e. the speed is in excess of the permissible speed, a brake application is made to reduce the speed of the train.

(b) If the count of the train speed control counter is behind that of the track signal counter a brake release application is made to allow the speed of the train to increase.

According to the content of the train speed control counter when the track signal counter reaches the count of 128 a number of circuits are energised to give a variation in brake application or brake release.

The speed control apparatus carried by the train will now be described with particular reference to FIGURES 3a, 3b and 3c of the accompanying drawings.

A superimposed command current signal is picked up from the track by means of pick-up coil 20 (FIG. 3b) and amplified in track signal amplifier 21 which comprises a transistor $T_6$ having the coil 20 connected between the base and emitter thereof. The emitter of transistor $T_6$ is grounded and diode $D_4$ is connected between the base and ground as shown. The amplified signals from the track signal amplifier 21 are passed from the collector of transistor $T_6$ to the input of the first stage of an 8-stage binary counter G (FIG. 3a) hereinafter termed the track signal counter via conductor 22, to initiate the count therein. The track signal counter is similar to the binary counter D described with reference to FIGURES 1 and 2, each stage comprising a bistable state flip-flop device of conventional design.

Coincident with the receipt of the first input impulse from the track, the train speed counter control H (FIG. 3b) is triggered to allow a signal from the axle driven generator 23 (FIG. 3c) on board the train, to pass to the input of the first stage of a further 8 stage binary counter J (FIG. 3b) hereinafter termed the train speed counter via conductor 24. The train speed counter J comprises a chain of bistable state flip-flop devices of conventional design and is identical with the construction of the track signal counter G (FIG. 3a).

The train speed counter control H (FIG. 3b) comprises a bistable state flip-flop device of conventional design and has one output thereof connected via conductor 25 to the base of transistor $T_7$, the emitter of which is grounded and the collector of which is connected to the output of axle driven generator 23 (FIG. 3c).

When the count in track signal counter G (FIG. 3a) reaches 128, the flip-flop constituting the last stage thereof is triggered in the same manner that the last stage of counter D (FIG. 2) was triggered when the superimposed current track equipment was previously described. The triggering of the flip-flop of the last stage of track signal counter G, supplies a signal to the input of track signal count complete gate K (FIG. 3a), preparing a circuit for the opening of gate K, but the opening thereof is delayed by a period determined by the time constant of a resistive-capacitive network forming part of the gating circuit K. This delay is introduced to ensure that a full 128 count is effected and no more or less than 128 impulses are received.

The track signal count complete gate K comprises a transistor $T_8$ having the base thereof connected to the output of the flip-flop forming the last stage of track signal counter G, via resistor 25 of 22 kilohms. The resistive capacitive network comprises resistor 26 of 4.7 kilohms connected in parallel with capacitor $C_7$ between the base of transistor $T_8$ and +6 v. conductor 27. The collector of transistor $T_8$ is connected to the base of a further transistor $T_9$ via series-connected resistor 28 and capacitor $C_8$. The base of transistor $T_9$ is connected to the +6 v. conductor 27 via resistor 29 and the emitters of transistors $T_8$, $T_9$ are commonly connected to earth. The collector of transistor $T_9$ is connected to diode matrix L (FIG. 3a) over conductor 30 for a purpose hereinafter defined.

If during the delay period of the count complete gate K, further input impulses are received and applied to track signal counter G, the flip-flop constituting the last stage thereof is reset and the count complete gate K remains closed. In this manner signals occurring subsequent to the receipt of 128 impulses are rejected by the system.

The triggering of the last stage of track signal counter G, in response to the receipt of the 128th input impulse, also triggers the flip-flop constituting the train speed counter control H (FIG. 3b), over conductor 31 to prevent further impulses from the axle driven generator 23, from passing to the train speed counter J, and thus storing the count reached in the train speed counter J. The count content of the train speed counter J may be less than, the same as, or in excess of that of the track signal counter G viz.: 128, according to the speed of the train, and this feature is utilized to determine whether a brake release or brake application is required to control the speed of the train.

When the track count complete gate K (FIG. 3a) opens after the delay determined by the time constant of the restrictive-capacitive network, a signal is applied to conductor 30 to allow signals to be produced on one of the output conductors 32 to 36 of diode matrix L, according to the staticised content of speed control counter J. Output signals on conductors 32 to 36 are passed to the inputs of output multi-stable circuit M (FIG. 3c), this circuit being arranged such that it is set to one of four conditions according to the signals received from diode matrix L and when set, remains in the set condition until a further input signal is received.

Each output conductor 32 to 36 of the diode matrix L (FIG. 3a) is connected to a separate voltage divider circuit of the output multi-stable circuit M (FIG. 3c). Each voltage divider circuit comprises a pair of series connected resistors shown in FIGURE 3c as resistors 37, 38; 39, 40; 41, 42; 43, 44; 45, 46; resistors 37, 39, 41, 43 and 45 are of 3.9 kilohms and resistors 38, 40, 42, 44 and 46 are of 15 kilohms. The voltage dividers are each connected to a +6 v. conductor 47 and connected to a —6 v. conductor 48 via respective resistors 49, 50, 51, 52, 53 of 4.7 kilohms and conductors 54, 55, 56, 57, 58. The output conductors 32 to 36 of the diode matrix L are connected to a point intermediate to the two series-connected resistors of the respective voltage divider, which points are also connected respectively to the bases of transistors $T_{10}$, $T_{11}$, $T_{12}$, $T_{13}$, $T_{14}$. The emitters of transistors $T_{10}$ to $T_{14}$ are connected respectively to the bases of transistor amplifiers $T_{15}$ to $T_{19}$ and the collectors of transistors $T_{10}$ to $T_{14}$ are connected to selected combinations of voltage divider conductors 54 to 58 through diodes as follows:

The collector of transistor $T_{10}$ is connected to conductor 55 via diode $D_5$, to conductor 58 via diode $D_6$, to conductor 57 via diode $D_7$ and to conductor 58 via diode $D_8$. Similarly, the collector of transistor $T_{11}$ is connected to conductors 54, 56, 57 and 58 via diodes $D_9$ to $D_{12}$ respectively, the collector of transistor $T_{12}$ is connected to conductors 54, 55, 57 and 58 via diodes $D_{13}$ to $D_{16}$ respectively, the collector of transistor $T_{13}$ is connected to conductors 54, 55, 56 and 58 via diodes $D_{17}$ to $D_{20}$ respectively and the collector of transistor $T_{14}$ is connected to conductors 54 to 57 via diodes $D_{21}$ to $D_{24}$ respectively. It will be seen that the output of each transistor $T_{10}$ to $T_{14}$ is connected to a different combination of four out of five of the voltage divider conductors 54 to 58 via their respective diodes. This enables the circuit to be set to any one of the four conditions according to the signals received from the diode matrix L on output conductors 32 to 36. The arrangement is such that when a negative impulse is applied to any of conductors 32 to 36 from the diode matrix L, the respective transistor $T_{10}$ to $T_{14}$ is rendered conductive. Collector current is then taken from the base circuits of the remaining non-conducting transistors $T_{10}$ to $T_{14}$ via their respective diodes. This has the effect of holding the junction of the respective 4.7 kilohm and 3.9 kilohm resistors at about 1 volt negative so that the bases of all the other transistors $T_{10}$ to $T_{14}$ are held positive through the voltage dividers. The circuit will remain in this condition when the input signal is removed and when a negative input impulse is applied to a different output conductor of diode matrix L, the circuit will change over to a new condition according to the particular transistor $T_{10}$ to $T_{14}$ rendered conducting in response to the new signal.

Transistors $T_{15}$ to $T_{19}$ are current amplifiers having the emitters thereof commonly connected to earth via resistor 59 of 10 ohms providing a small amount of self bias to ensure that if the input lines not receiving a negative impulse are slightly positive, the appropriate transistors $T_{10}$ to $T_{14}$ will remain non-conductive. The collectors of transistors $T_{15}$, $T_{16}$, $T_{17}$ and $T_{19}$ are each connected to a respective one of output relays $R_1$ to $R_4$, such relays having associated contacts $r_1$ to $r_4$ respectively, adapted when actuated to control the rate of braking in brake operating equipment N (FIG. 3c).

Relays $R_1$ to $R_4$ and their associated contacts $r_1$ to $r_4$ are designated by the legends TS, S, F and C respectively and, indicative of the conditions "Too slow," "Slow," "Fast and correct" (see FIG. 3c). When relay $R_1$(TS) is energised in response to an input signal on conductor 32 and consequent conduction in transistor $T_{10}$, current is supplied to the brake operating equipment N on conductor 60 to effect a brake release, the content of train speed counter J and the presence of a negative impulse on conductor 32 indicating that the speed of the train is well below a predetermined value. Energisation of relay $R_2$(S) in response to an input impulse on conductor 33 and consequent conduction in transistor $T_{11}$, supplies current via conductor 61 to the brake operating equipment N, to effect reduced retardatiton, the content of the train speed counter J and the presence of the input impulse on conductor 33 indicating that the speed of the train is slightly below the predetermined value. Energisation of relay $R_3$(F) following the receipt of an impulse on conductor 34 and consequent conduction in transistor $T_{12}$, actuates relay $r_3$ to supply current to the braking equipment N to effect maximum retardation, the content of the speed counter J indicating that the speed is considerably in excess of the predetermined value. When the content of the train speed counter J is the same as that of the track signal counter G at the end of the count of the latter, an input impulse is present on conductor 36 and conduction in transistor $T_{14}$ produces energisation of relay $R_4$(C) and consequent actuation of associated relay contact $r_4$ to supply current to the braking equipment N. This current provides for normal retardation i.e. the speed of the train is within the predetermined limits laid down for correct running.

Each output relay corresponds to different train speeds and the result of the comparison between the counts of the track and train counters. Each relay responds to a different ratio of the range of counts and the ratios chosen for the four output conditions can be selected according to circumstances and more or less than four outputs may be provided as required.

Any output from the output multi-stable circuit represents the degree of divergence from the desired speed at the moment of passing over the sections of rail receiving superimposed command current, and thus is a measure of the retardation rate that should be applied to the train.

The brake operating equipment N (FIG. 3c) actuated in response to the output signals from the output multi-stable and relay circuit M, will be briefly described but it should be understood that the constructional features thereof form no part of the present invention.

Signals on conductors 60 to 63 from the output relays $R_1$ to $R_4$ are supplied to braking indication relays 64. Signals received from the output multi-stable and relay circuit M indicative that the speed of the train is "too slow" are passed via route 65 to the traction circuits 78 to effect a brake release and provide increased traction to the train. Signals applied to the braking indication relays on lines 61 to 63 and indicative that the speed of the train is "slow," "fast" or "normal" are passed on line 66 to mercury retardation governors 67 on the train. Signals indicative of the speed of the train are passed on line 68 to the brake controls 69 to effect the necessary maximum retardation or reduced retardation according to whether the speed of the train is in excess of or below the predetermined value.

Currents of "470 code," "270 code" and "180 code" are passed from the coded cab signalling equipment on lines 71, 72, 73 respectively to indication relays 74. The coded cab signalling equipment has one input thereof connected across a further pick up coil 20a via conductors 75, 76. Signals of "470 code" are transmitted from indication relays 74 on line 77 to the traction circuits since a "470 code" signal allows the train to proceed at full speed.

Signals of "270" and "180 code" are passed to the train speed governor 79 via line 80. As previously described, the signals of "270 code" are used to apply power to the traction circuits, to get the train moving again after it has stopped at a signal. "180 code" signals are used to permit the train to proceed at 22 m.p.h. and to effect a braking application if the speed of the train exceeds this value. Signals indicative of speeds below 23 m.p.h. are passed from the speed governor 79 to the traction circuits 78 on line 81 to increase the speed of the train up to the predetermined value, signals indicative of speeds over 25 m.p.h. but below 27 m.p.h. are applied to the mercury retardation governors 67 via line 82 to provide a slight reduction of the speed of the train down to the predetermined value, and signals indicative of speeds in excess of 27 m.p.h. are passed via line 83 to the brake trip valve 84 to apply increased braking to the train by means of brake controls 69.

*No signal detector*

The function of the no signal detector P (FIG. 3b) is to restore the track signal counter G (FIG. 3a) and the train speed counter J (FIG. 3b) to zero at the end of a signal period or in the event of a signal containing less than 128 impulses. A reset signal is generated by the detector P and this must be delayed by a period greater than the delay effected by the time constant circuit of the count complete gate K (FIG. 3a), which must itself be delayed by more than one cycle of the lowest frequency to be picked up, as previously described in order to ensure that a full 128 count is always present in the track counter.

The output signal from the detector is an impulse of approximately +1 v. at low impedance and resets both counters to zero.

Referring to box P of FIGURE 3b, an amplifying transistor $T_{20}$ has the base thereof connected via resistor 86 of 47 kilohms to the collector circuit of transistor amplifier $T_6$ of track signal amplifier 21, and via resistor 87 of 220 kilohms to the +6 v. conductor 88. The emitter of transistor $T_{20}$ is earthed and the collector connected to −6 v. line 89 via resistor 90 of 2.7 kilohms. Transistor $T_{10}$ amplifies the signal applied to the base thereof and applies the amplified impulses to the base of transistor $T_{21}$ via resistor 91 of 0.68 kilohm. The base of transistor $T_{21}$ is tied to the +6 v. conductor 88 via resistor 92 of 10 kilohms and the emitter earthed. The collector of transistor $T_{21}$ is coupled to −6 v. line 89 via a voltage divider comprising series-connected resistors 93, 94 of 22 ohms and 47 kilohms respectively. A capacitor $C_9$ of 0.25 μf. is connected between −6 v. line 89 and a point intermediate resistors 93, 94. The output on the collector of transistor $T_{21}$ is suppressed during the whole of the pulse train by virtue of the time constant of capacitor $C_9$ and resistor 94. The output from transistor $T_{21}$ must occur after the end of a train of pulses but must be delayed sufficiently for the track signal count complete gate K (FIG. 3a) to open. Thus the value of capacitor $C_9$ is chosen accordingly and the ultimate discharge of this capacitor determines the time delay required. The output from the collector of transistor $T_{21}$ is applied to the base of transistor $T_{22}$ via resistor 95 of 47 kilohms and proceeds via transistors $T_{23}$, $T_{24}$ to the collector of the latter and applied via conductor 96 to the inputs of the train speed counter J and track signal counter G (FIG. 3a) to effect the resetting to zero thereof. Transistor $T_{22}$, $T_{23}$, $T_{24}$ provide the necessary shaping and inversion of the output from transistor $T_{21}$ such that the resetting pulse arrives on line 96 towards the end of the discharge period of capacitor $C_9$ and is of the required power and polarity necessary to reset the counters G (FIG. 3a) and J (FIG. 3b) to zero.

The condition of the various stages of the no-signal detector P (FIG. 3b) is shown diagrammatically in FIGURE 4 and is believed to be self explanatory and to require no further description, the signal period and the delay period effected by capacitor $C_9$ being clearly shown.

*Superimposed command system control for stopping at stations*

The superimposed command system allows the speed of the train to be controlled during its approach or run-in to a station and allows the train to be stopped always at the same fixed predetermined point in a station irrespective of variable factors such as speed, load, brake efficiency etc. The superimposed command equipment takes account of and compensates for the approach speed of the train, variations in loading of the train and brake efficiency and any other variable factors such that the train is brought to rest at the same place in the station each time.

This control is effected by providing a plurality of check points along the track at each of which a distinctive superimposed command frequency is applied to the track, the check points being spaced apart by predetermined distances and extending from the limit of the approach area to the stopping point of the train, such that at each check point, any disparity between the track and train frequencies produces an error signal which is used to correct the speed of the train by operation of brake control mechanism as hereinbefore described, as the train approaches the station.

To correctly define and accurately locate the check points along the track, a braking curve is plotted for a predetermined approach length of track, giving speed/distance relationships and such a braking curve is shown in FIGURE 5. A series of speed points, say 8, is chosen on the braking curve, and the positions corresponding to these speeds on the track found. At each of these points on the track, a superimposed command frequency is applied to the rail, the frequency being obtained from the speed/frequency ratio previously specified; the speed being obtained from the braking curve for the point under consideration. The first frequency is chosen at a little below the speed of the lowest normal approach speed under free running, and this frequency actuates the frequency counter to give a full service brake application.

At each subsequent check point on the track, the actual speed of the train as indicated by the frequency generated by the train is compared with the calculation speed, as represented by the superimposed command frequency applied at the check point and a correction made by a partial brake release or a further brake application. A tuned circuit operating at 400 cycles produces an output signal which is applied to the braking mechanism and operates at about 4 miles per hour to give a smooth stop by a partial brake release.

It is thus seen that the speed of a train can be controlled and gradually reduced during its run-in to a station and eventually the train can be stopped at the last check point in the series irrespective of the load, speed and efficiency of the brakes of the train since the speed of the train is successively checked and corrected from the beginning of the run-in until it arrives at the last check or stopping point in the series. Thus should under or over-braking occur at any check point due to insufficient allowance for speed and/or load and/or braking efficiency, the required additional correction will be effected at the succeeding check point(s) according to the significance of the error signal produced.

Because the train is automatically driven, two speeds only would be applicable at approaching stations.

(1) Full speed as determined by the gradient of the track for a clear run in.

(2) 22 miles per hour for a run in checked by safety signals.

In the case of the 22 miles per hour approach, a frequency spot of 20 kc./s., i.e. a much higher frequency from that of the normal braking curve frequencies, is provided to make a brake application sufficiently early for the 22 mile per hour approach, and to allow for lag in the brake mechanism.

This frequency can respond through a circuit tuned to this frequency to produce a signal applied to the braking mechanism but arranged to be effective only if the brakes were not already applied, and in consequence would not affect a normal run in to a station, i.e. with clear tracks. If the 20 kc./s. frequency spot has produced such a special brake application with consequent slow run in, the progress of the train and eventual stopping thereof would follow the braking curve.

*Operation of command frequency spots for coasting and braking over a typical section of track with clear tracks*

It will be assumed that a train is running between two stations situated a comparatively short distance, e.g. 3,500 feet apart, with clear tracks, with only a single intermediate signal stop. A train moving away from one station will accelerate to nearly 40 m.p.h. and at a predetermined distance from the station, e.g. 1,250 feet, a 15 kc. command frequency spot is introduced into the track. This frequency spot provides for coasting, by causing a relay on the train to be actuated to produce a signal to switch off the motors, allowing the train to coast at a controlled speed. Arrangements would be made to switch the coasting frequency spot to selected sections of the track to suit different traffic conditions. Shortly before the train reaches the approaching station, it will pick up a 3.5 kc. command frequency spot from the track indicating a required speed of 35 m.p.h. and the speed comparison, previously referred to, will be made. If the actual speed recorded by the speed generator on the train is the same as that corresponding to the 3.5 kc./s. frequency spot, the train and track speed counters will provide equal binary counts and a normal brake application will be made allowing the train to decelerate following the braking curve calculated for the run-in to the station. The train, during its subsequent controlled run-in will pass a plurality of further command spots, e.g. 3 kc./s., 2.5 kc./s., 2 kc./s., 1.5 kc./s., and 1 kc. and speed checks are performed at each point to adjust the braking. The train will thus eventually come to rest at a predetermined point in the station determined by the braking curve. The frequency spots referred to above are given by way of example only and it will be appreciated that the number and positioning of the command spots can be adjusted to suit the requirements of any particular section of track and can be arranged to take account of gradients and curves.

The intermediate signal stop, i.e. the 20 kc./s. frequency spot will be referred to when describing the combined operation of the command spots and safety signalling in connection with traffic conditions on unclear tracks and in connection with the stopping of a train at a signal position.

STOPPING THE TRAIN AT A SIGNAL POSITION

Taking as an example the intermediate stop signal position between stations—and this would be a train control stopping point—at full braking distance, before reaching this point, a 20 kc./s. superimposed frequency spot is applied to the track. This signal, when picked up by the train, causes a full service brake application to be made. Should the train come to a complete halt, a signal is necessary to allow power to be reapplied to the driving motors to enable the train to restart. Where the train has been brought to a halt at a signal position by reason of the fact that the line ahead is obstructed by another train, the progress of the leading train beyond a section controlling the following train is used to produce a signal in the section containing the following train, such as to restart the motors. Conveniently, use is made of the "270 code" of the coded current system for this purpose but any signal initiated by the progress of the leading train may be used to achieve the same result.

The above arrangements provide for the train to be stopped without over-running a signal position.

In the event of this stopping equipment failing to operate, when the train reaches the position on the track where a "120 code" or "no code" safety signal is received, an emergency brake application will be effected which will bring the train to rest within the overlap distance for that signal position.

COMBINED OPERATION OF COMMAND FREQUENCY SPOTS AND SAFETY SIGNALLING FOR SAFE GUARDING THE RUNNING OF A TRAIN IN RELATION TO THE POSITION OF A PRECEDING TRAIN

The equipment will be arranged in order that the train may run into a station at a controlled speed of, say, 22 m.p.h. and brake to a stop in accordance with the superimposed spot frequencies applied to the track in the vicinity of the station, as previously described. Thus, under normal running conditions the operation will be entirely under the control of the superimposed command current system.

In the event of there being a train in front, the signal safety circuits will show the safety codes necessary to effect emergency braking of a following train in the event of any failure of the superimposed command current system. However, it will be appreciated that the operation of the automatic driver is arranged to anticipate the safety signalling and therefore there should never be cause for an emergency brake application if the automatic driver equipment and commands are functioning correctly.

Thus, assume that a leading train is standing in a station and a train is following on the same track. The 20 kc./s. frequency spot is provided at a convenient point and is located sufficiently far out from the station to reduce the speed of the following train to below 25 m.p.h. for the run in to the station. The following train may be brought to a stop following detection of the 20 kc./s. spot, or merely slowed down depending upon the conditions prevailing ahead of the following train. If the following train has been brought to rest, it will be restarted automatically when the leading train commences to move out of the station since the safety code in the sections immediately behind the section containing the leading train will show "120 code" followed by a section containing the following train showing "270 code" which, as previously indicated is the means conveniently used to effect restarting of a train from rest. The presence of the "270 code" will cause the brakes on the following train to be released and the motoring circuit to be completed. The following train will thus start to move, but runs only at the controlled speed of 22 m.p.h. as determined by the speed governor on the train and, under this condition, follows a safe distance behind the leading train which at this time is accelerating up to full speed.

As the leading train draws clear of the station, the "270 code" shows in the section immediately in front of the following train with "120 code" sections showing immediately behind the leading train to allow for emergency braking. As the train ahead continues to draw clear of the station, the "120 code" section immediately in front of the first "270 code" section is changed to "180 code" since at this point during the run into the station, it is not necessary for the following train to motor and the "180 code" allows for the controlled speed to be retained without motoring, in the event of any failure by the speed governor on the train to retain the controlled speed. As the leading train accelerates to a position far enough ahead of the following train for there to be an emergency braking distance of, e.g. 120 feet between the end of the station and the leading train, the following train runs into the station at the controlled speed of 22 m.p.h., the "180 code" showing throughout the sections spanned by the station and with "120 code" showing in that section immediately behind the leading train as the safety precaution.

The braking to a halt in the station will take place from the reduced speed of 22 m.p.h. and will be under the control of the superimposed command frequency spots applied to the track in the station section. Any frequency spots equivalent to speeds greatly in excess of 22 m.p.h., such as 3.5 kc./s. and 3 kc./s. will be ignored but at the command spot of 2.5 kc./s., a speed comparison will be effected resulting in a minimum brake application. At the 2 kc./s. frequency spot the speed will be checked and the braking adjusted accordingly and the procedure will be repeated at 1.5 kc./s. and 1 kc. frequency spots, thus finally bringing the train to rest at the same stopping point in the station, as for a normal run-in on clear tracks, despite the reduced approach speed.

It will be appreciated that after the signal check produced by the 20 kc./s. frequency spot, if it has been necessary to restart the train, it will run into a station entirely under the control of the superimposed command current system of frequency spots, and under the control of the speed governor on the train, the signalling being so planned that running under the controlled speed of 22 m.p.h. the train always anticipates the changes in codes of the safety signalling system ahead of the train. If, however, the governing equipment on the train failed to operate correctly, the safety equipment would cause an emergency brake application to be made independently of the command system.

I claim:

1. An automatic electric train operation system wherein command current signals are provided for the control of the running and breaking of trains, the signals each having a frequency determined by a control function to be performed thereby and being selectively applied to lengths of rail at predetermined points along the track, coil means carried by the train and responsive to signals applied to the track, a multi-stage track signal counter arranged to count a predetermined number of the signals picked up by said coil means, a multi-stage train speed counter arranged to be supplied with and to count signals having a frequency proportional to the speed of the train, the counts in the track signal counter and the train speed counter being initiated in response to the receipt of a command signal from the track, and terminated when the track signal counter receives said predetermined number of signals from the track, and means for producing a signal indicative of the content of the train speed counter and thus of the speed of the train such that a brake application or release may be made according to whether the speed of the train is in excess of or below a predetermined allowable value.

2. An automatic electric train operation system according to claim 1 wherein the command current signals are produced in the form of trains of impulses, each impulse train having a frequency determined by the function to be performed thereby, and each being produced by current impulse generating means adapted to supply said impulses to a selected length of one running rail of the track, and means for successively interrupting the transmission of impulses to the line for periods equivalent to the duration of the impulse train such that a continuous on-off cycling is produced.

3. An automatic electric train operation system as claimed in claim 2 wherein the impulse generating means comprises a sine-wave oscillator arranged to supply a train of impulses to the rail via an output circuit, and in addition to supply said train of impulses to the input of the first stage of a binary counting device, the last stage of which comprises a bistable state trigger device having the output thereof connected to a point intermediate the oscillator and the output circuit via means adapted to interrupt the supply of impulses to the rail whenever the bistable state device is triggered from its first state to its second state and to restore the flow of impulses to the rail whenever the bistable state device is restored to said first state, the duration of the pulse train and the period between pulse trains being identical.

4. An automatic electric train operation system as claimed in claim 1 wherein the last stage of said track signal counter comprises a bistable state trigger device adapted to be triggered from one state to the other when the count in the track signal counter reaches said predetermined value, a gating device having the input thereof connected to the output of the bistable state device and arranged to be opened in response to the triggering of said bistable state device to said other state, to produce an output signal at the output of said gating device, a matrix network having the coordinates connected to the output of the gating device and the train speed counter so as to produce on one of a plurality of output conductors of the matrix, a signal indicative of the content of the train speed counter, a plurality of relay means one of which is adapted to be energized according to which output conductor of the matrix has a signal present thereon, and braking control means adapted to be actuated in accordance with the particular relay energized so as to adjust the speed of the train where required to the predetermined allowable value.

5. An automatic electric train operation system according to claim 4 wherein said gating device includes a resistive-capacitive circuit, the time constant of which is effective to delay the opening of the gating device.

6. An automatic electric train operation system as claimed in claim 5 wherein circuit means are provided responsive to the signals picked up from the track, said circuit means being arranged to provide an output signal adapted to reset the track signal counter and train speed counter to zero and including delay means for ensuring that the reset signal does not occur prior to the delayed opening of the gating device associated with the track signal counter.

7. An automatic electric train operation system according to claim 6 wherein said circuit means includes an amplifying stage adapted to provide amplification of the signals picked up from the track, said amplified signals being applied to the input of an impulse suppression stage including a capacitor and resistor arrangement having a time constant such that any output impulse produced from the circuit means occurs after the end of each train of impulses and is delayed sufficiently for opening of the gating device to occur.

8. An automatic electric train operation system according to claim 1 wherein the command current signals are picked up by induction from the running rail by a coil mounted beneath the train.

9. An automatic electric train operation system according to claim 1 wherein each train is provided with a frequency generator combined with a centrifugal governor attached to one of the axles of the train to provide signals indicative of the speed of the train.

10. An automatic electric train operation system according to claim 9 wherein the speed signals are applied to the input of the first stage of the train speed counter, said frequency generator including a plurality of magnetic rings each having a separate pick-up coil associated therewith, each magnetic ring corresponding to a particular train wheel diameter one of said magnetic rings being selected according to the particular wheel diameter and each ring being magnetised with a series of poles to give the frequency in relation to the speed for the wheel diameter associated with the ring.

11. An automatic electric train operation system according to claim 1 wherein a plurality of check points are provided along the track in the vicinity of a station, command current signals each of distinctive frequency being applied to one running rail at each check point such that at each check point any disparity between the frequencies of the signals picked up from the track and those indicative of the speed of the train, produces an error signal which is applied to brake control mechanism to ensure that trains approach the station at a predetermined speed and stop at a predetermined point in the station.

12. An automatic electric train operation system according to claim 1 wherein an intermediate signal position is provided with a command current signal of a predetermined frequency adapted, when picked up by a train, to cause a full service brake application to be made.

13. An automatic electric train operation system as claimed in claim 12 wherein where a train has been brought to a complete halt following the pick-up of the predetermined command frequency signal, restarting of the train is effected by the application of a coded current to the section of the track containing the stationary train in response to the progress of a preceding train beyond a section controlling the stationary train.

14. An automatic electric train operation system according to claim 1 wherein command current signals of a distinctive frequency are applied to selected points along the track to effect switching-off of the motors to allow the train to coast at a controlled speed.

15. An automatic electric train operation system as claimed in claim 14 wherein a relay is provided on the train and is adapted to be actuated in response to a signal of said distinctive frequency to provide a further signal for switching-off the motors.

References Cited by the Examiner

UNITED STATES PATENTS

| | | | |
|---|---|---|---|
| 2,754,413 | 7/1956 | Martin | 246—63 X |
| 3,201,583 | 8/1965 | Rolle | 246—182 X |

FOREIGN PATENTS

| | | |
|---|---|---|
| 1,272,410 | 8/1961 | France. |
| 1,259,012 | 3/1961 | France. |
| 972,859 | 10/1964 | Great Britain. |

OTHER REFERENCES

Railway Signaling and Communications, September 1963, pages 16 and 17 (Simmons-Boardman N.Y.).

ARTHUR L. LA POINT, *Primary Examiner.*

S. B. GREEN, *Assistant Examiner.*